United States Patent [19]

Frey et al.

[11] Patent Number: 5,015,605

[45] Date of Patent: May 14, 1991

[54] PROCESS FOR PREPARING HIGHLY POROUS GLASS-CERAMIC MOLDED PARTS

[75] Inventors: Volker Frey; Bernd Pachaly; Norbert Zeller, all of Burghausen, Fed. Rep. of Germany

[73] Assignee: Wacker-Chemie GmbH, Munich, Fed. Rep. of Germany

[21] Appl. No.: 206,146

[22] Filed: Jun. 13, 1988

[30] Foreign Application Priority Data

Jul. 8, 1987 [DE] Fed. Rep. of Germany ....... 3722597

[51] Int. Cl.$^5$ ............................. F27B 9/04; F27B 9/10
[52] U.S. Cl. ........................................ 501/12; 501/11; 264/65
[58] Field of Search ......................... 501/12, 80, 81, 84

[56] References Cited

U.S. PATENT DOCUMENTS

| | | | |
|---|---|---|---|
| Re. 32,107 | 4/1986 | January | 501/12 |
| 4,640,901 | 2/1987 | Lee et al. | 501/81 |
| 4,686,124 | 8/1987 | Onohara et al. | 428/35 |
| 4,705,837 | 11/1987 | Seyfetive et al. | 528/31 |
| 4,789,389 | 12/1988 | Schermerhorn et al. | 65/3.12 |
| 4,814,231 | 3/1989 | Onohara et al. | 428/451 |
| 4,818,732 | 4/1989 | Fox et al. | 501/84 |
| 4,828,588 | 5/1989 | Hwang et al. | 55/158 |
| 4,834,721 | 5/1989 | Onohara et al. | 428/451 |

Primary Examiner—William R. Dixon, Jr.
Assistant Examiner—Alan Wright

[57] ABSTRACT

The invention relates to a process for preparing highly porous glass-ceramic molded parts having carbon atoms linked to silicon atoms, which comprises reacting a molded part, containing an organopolysiloxane which is solid at room temperature, and consists of units of the formula $$\begin{array}{c} R-SiO, \\ | \\ CH_3 \end{array}$$

where R is a radical selected from the formulas $$\begin{array}{c} CH_3 \\ | \\ -SiO \end{array} \text{ or }$$

$$\begin{array}{c} CH_3 \\ | \\ -SiO_{\frac{1}{2}} \\ | \\ CH_3 \end{array}$$

and is linked via a single silicon-silicon bonded, in a non-oxidizing atmosphere or in vacuo at temperatures ranging from 700° to 1300° C.

5 Claims, No Drawings

PROCESS FOR PREPARING HIGHLY POROUS GLASS-CERAMIC MOLDED PARTS

The present invention relates to highly porous glass-ceramic molded parts and more particularly to a process for preparing highly porous glass-ceramic molded parts which have reproducible dimensions and are free of defects.

BACKGROUND OF THE INVENTION

Carbon-containing monolithic glasses obtained from organosilsesquioxane gels of the general formula $RSiO_{3/2}$ are described in European Patent EP-A-107,943. Due to the low porosity of these gels, molded parts free from defects cannot be produced, except by costly drying processes and even then dimensional reproducibility of the molded parts is not assured.

It is an object of this invention to provide a process for preparing highly porous glass-ceramic molded parts which have carbon atoms linked to silicon atoms, and are free from defects and have reproducible dimensions and high porosity. A further object of the present invention is to provide a process for preparing highly porous glass-ceramic molded parts which are free of defects and have reproducible dimensions in the absence of costly drying and processing methods.

SUMMARY OF THE INVENTION

The foregoing objects and others which will become apparent from the following description are accomplished in accordance with this invention, generally speaking, by providing a process for preparing highly porous glass-ceramic molded parts having carbon atoms linked to silicon atoms, which comprises reacting a molded part containing an organopolysiloxane which is solid at room temperature and contains units of the formula

where R is a radical selected from the group consisting of

and

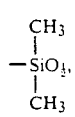

and is linked via a single silicon-silicon bond, in a non-oxidizing atmosphere or in vacuo at temperatures ranging from 700° to 1300° C.

DESCRIPTION OF THE INVENTION

The highly porous glass-ceramic molded parts which are free of defects and have reproducible dimensions are prepared by reacting a molded part consisting of an organopolysiloxane which is solid at room temperature and contains units of the formula

where R is the same as above, in a non-oxidizing atmosphere or in vacuo at temperatures of from 700° to 1300° C. and more preferable at temperatures of from 900° to 1100° C.

In the process of this invention there is a reproducible volume shrinkage of from 40 to 55 percent, depending on the composition used in the molded part, consisting of an organopolysiloxane which is solid at room temperature. This is of critical significance in the preparation of molded parts having reproducible dimensions. In addition, the weight loss is from 15 to 20 percent.

The reaction is carried out in a non-oxidizing atmosphere, i.e., in an inert atmosphere such as nitrogen or argon, or in a reducing atmosphere such as carbon monoxide or hydrogen, or in vacuo. The heat-up cycle must be adapted to the particular problem in question and will depend essentially on residual solvent content and on the size and shape of the molded part.

The molded parts used according to this invention, contain an organopolysiloxane which is solid at room temperature and consists of units of the formula

where R is a radical selected from the formulas

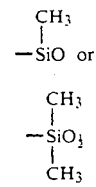

and is linked via a single silicon-silicon bond, and are preferably obtained from a sol-gel process where a disilane of the general formula

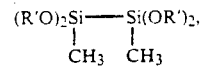

in which each R' represents the same or different alkyl radicals having from 1 to 3 carbon atoms, such as the methyl, ethyl, or isopropyl radical, and optionally in admixture with a disilane of the general formula

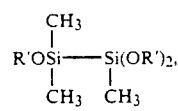

in which R' is the same as above, is reacted with water, and optionally in the presence of an alcohol, in a mold, followed by the addition of ammonia.

The molds can give rise to parts of various shapes, for example, as cylinders or parallelepipeds. The preferred volume of these parts is in the range of from 1 to 500 $cm^3$. The molds are preferably made from materials such as teflon, polyethylene, glass or aluminum.

Preferred parameters in the preparation of molded parts containing an organopolysiloxane, which is solid at room temperature, and consists of units of the formula $$\begin{array}{c} R-SiO, \\ | \\ CH_3 \end{array}$$

where R is a radical selected from the formulas $$\begin{array}{c} CH_3 \\ | \\ -SiO \end{array} \text{ or }$$

$$\begin{array}{c} CH_3 \\ | \\ -SiO_{\frac{1}{2}} \\ | \\ CH_3 \end{array}$$

and is linked via a single silicon-silicon bond, are compositions containing:
0 to 40 percent by weight, and more preferably from 15 to 30 percent by weight of alcohol;
20 to 50 percent by weight, and more preferably from 25 to 40 percent by weight of water; and from
40 to 60 percent by weight, and more preferably from 43 to 52 percent by weight of disilane.

The temperature may range from 10° to 50° C., and more preferably from 15° to 30° C.

Excellent results were obtained using 22 percent by weight of alcohol, 33 percent by weight of water and 45 percent by weight of disilane.

$$\begin{array}{c} (R'O)_2Si\text{------}Si(OR')_2, \\ | \quad\quad\quad | \\ CH_3 \quad CH_3 \end{array}$$

Disilanes of the general formulas
in which each R' represents a methyl, ethyl or isopropyl radical, and $$\begin{array}{c} CH_3 \\ | \\ R'OSi\text{------}Si(OR')_2, \\ | \quad\quad\quad | \\ CH_3 \quad CH_3 \end{array}$$

in which R' is the same as above are known compounds and, according to Hengge et al., Journal of Organometallic Chemistry, 7, 71–78 (1967), are readily available. The preferred disilanes are 1,2-dimethyltetramethoxydisilane and 1,1,2-trimethyltrimethoxydisilane.

Preferred examples of alcohols are methanol, ethanol and isopropanol.

The molded parts used according to this invention, consist of an organopolysiloxane, which is solid at room temperature, and consists of units of the formula $$\begin{array}{c} R-SiO, \\ | \\ CH_3 \end{array}$$

where R is a radical selected from the formulas $$\begin{array}{c} CH_3 \\ | \\ -SiO \end{array} \text{ or }$$

$$\begin{array}{c} CH_3 \\ | \\ -SiO_{\frac{1}{2}} \\ | \\ CH_3 \end{array}$$

and is linked via a single silicon-silicon bond, and are preferably obtained from a sol-gel process where a disilane of the general formula $$\begin{array}{c} (R'O)_2Si\text{------}Si(OR')_2, \\ | \quad\quad\quad | \\ CH_3 \quad CH_3 \end{array}$$

in which each R' represents a methyl, ethyl or isopropyl radical, optionally in admixture with a disilane of the general formula $$\begin{array}{c} CH_3 \\ | \\ R'OSi\text{------}Si(OR')_2. \\ | \quad\quad\quad | \\ CH_3 \quad CH_3 \end{array}$$

where R' is the same as above, is reacted with water, optionally in the presence of alcohol, in a mold, followed by the addition of ammonia until a pH in the range from 6.0 to 6.5 is attained.

The pH adjustment is made by the addition of ammonia, which can be achieved, for example, by adding aqueous ammonia, or by passing in gaseous ammonia or by adding substances which split off ammonia by heat, such as Urotropin, urea or basic ammonium salts, for example, $(NH)_2CO_3$.

The molded part, comprises an organopolysiloxane, which is solid at room temperature and consists of units of the formula $$\begin{array}{c} R-SiO. \\ | \\ CH_3 \end{array}$$

where R is a radical selected from the group consisting of a radical of the formulas $$\begin{array}{c} CH_3 \\ | \\ -SiO \end{array} \text{ or }$$

$$\begin{array}{c} CH_3 \\ | \\ -SiO_{\frac{1}{2}}, \\ | \\ CH_3 \end{array}$$

and is linked via a single silicon-silicon bond, and can be removed from the mold after gelling and dried in air at temperatures of from 20° to 150° C., and more preferably from 25° to 100° C. This results in a molded part having a reproducible shrinkage depending on the selected composition of the molded part, which is of crucial significance for the production of molded parts having reproducible dimensions.

The highly porous glass-ceramic molded parts produced by the process of this invention which have carbon atoms attached to silicon atoms, have a density of from 0.7 to 0.8 g/cm³ at a porosity of from 60 to 70 percent. They are electrically non-conductive and have good resistance to temperature changes up to 1000° C.

They are thermally resistant up to a temperature of 1300° C.

Glass-ceramic molded parts produced by the process of this invention are employed for thermal insulation and for filtration, preferably at high temperatures or high pressures.

EXAMPLES 1 to 4

A concentrated ammonia solution was added to a sol prepared from water, methanol and 1,2-dimethyltetramethoxydisilane until an initial pH of 4.8 rose to 6.0 (see Table 1). The sol was then poured into a cylindrical mold made from glass having an internal diameter of 30 mm and a height of 100 mm. The sol gelled to a highly porous gel after 10 to 15 minutes. After an additional 10 minutes, the gel was removed from the mold and dried in air for 24 hours. Table 1 shows the density d (g/cm$^3$) and the diameter contraction D (percent in relation to the mold diameter) of the dried molded parts.

TABLE 1

| Example | H$_2$O % by wt. | MeOH % by wt. | Disilane % by wt. | pH | d | D |
|---|---|---|---|---|---|---|
| 1 | 26 | 23 | 51 | 6.0 | 0.53 | 18.5 |
| 2 | 34 | 21 | 45 | 6.0 | 0.49 | 14.7 |
| 3 | 33 | 22 | 45 | 6.0 | 0.37 | 11.1 |
| 4 | 32 | 26 | 42 | 6.0 | 0.34 | 11.1 |

EXAMPLE 5

A concentrated ammonia solution was added to a sol prepared from 72.5 g (8 mol) of water, 48.0 g (3 mol) of methanol and 105 g (0.5 mol) of 1,2-dimethyltetramethoxyiisilane until the initial pH rose from 4.8 to 6.0. The sol was then poured into a tile-shaped mold made of polyethylene with internal dimensions of 100×100×30 mm. After 10 minutes at 25° C., the sol gelled to a highly porous gel which completely filled the mold. After an additional 10 minutes, the molded part was removed from the mold and dried in air at 25° C. for 24 hours. The resultant molded part had a density of 0.38 g/cm3 20, and the length of the edge had shrunk by 11 percent.

EXAMPLES 6 to 8

The test pieces produced in Examples 2, 3 and 4 were heated to 1000° C. in a compartment kiln flushed with argon, and maintained at this temperature for 60 minutes. Table 2 shows the loss in mass in percent and the density in g/cm$^3$.

TABLE 2

| Example | Mass Loss | Density | Test piece produced in Example |
|---|---|---|---|
| 6 | 17.1 | 0.74 | 2 |
| 7 | 17.2 | 0.79 | 3 |
| 8 | 17.3 | 0.70 | 4 |

EXAMPLE 9

A dry-gel tile prepared in accordance with the procedure described in Example 5 was heated to 1000° C. in a compartment kiln flushed with argon, and maintained at this temperature for 60 minutes A black porous tile was obtained on cooling which lost 17.3 percent in weight and 45.9 percent in volume compared with the dry gel. The material had a density of 0.75 g/cm$^3$ at a porosity of b 66.8 percent. Porosity determination by Hg porosimetry produced a very narrow pore size distribution having a maximum of about 4 micrometers. The surface, determined by the BET method, was 1.5 m$^2$/g.

EXAMPLE 10

A highly porous carbon-containing glass-ceramic tile produced in accordance with the procedure described in Example 9 was heated at 1300° C. in a compartment kiln in air and maintained at this temperature for 10 hours. The tile showed no change in weight on cooling.

This tile was again heated to 1000° C. in a compartment kiln and rapidly plunged into water at 25° C. The tile incurred no damage even when this procedure was repeated ten times.

What is claimed is:

1. A process for preparing highly porous glass-ceramic molded parts having carbon atoms linked to silicon atoms, which comprises heating a molded part containing an organopolysiloxane which is solid at room temperature and consists of units of the formula

where R is a radical selected from the group consisting of

and

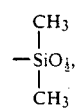

which is linked via a single silicon-silicon bond and is obtained from a sol-gel process, in a nonoxidizing atmosphere or in vacuo at temperatures of from 700° to 1300° C. until a highly porous glass ceramic part is formed.

2. The process of claim 1, wherein the molded part containing an organopolysiloxane which is solid at room temperature, and consists of units of the formula

where R is a radical selected from the group consisting of

and

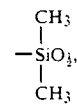

which is attached via a single silicon-silicon bond, is obtained by reacting a disilane of the formula

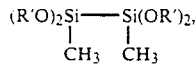

in which R' is an alkyl radical having from 1 to 3 carbon atoms, with water, and optionally an alcohol, in a mold, and thereafter ammonia is added.

3. The process of claim 2, wherein 1,2-dimethyltetramethoxydisilane is used as disilane.

4. The process of claim 3, wherein 0 to 40 percent by weight of alcohol, 20 to 50 percent by weight of water and 40 to 60 percent by weight of disilane are used.

5. The process as claimed in claim 2 or 3, wherein ammonia is added until a pH in the range of from 6.0 to 6.5 is attained.

* * * * *